US012108088B2

(12) United States Patent
Sánchez De La Fuente et al.

(10) Patent No.: US 12,108,088 B2
(45) Date of Patent: Oct. 1, 2024

(54) USAGE OF ACCESS UNIT DELIMITERS AND ADAPTATION PARAMETER SETS

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 146 days.

(21) Appl. No.: 17/636,564

(22) PCT Filed: Aug. 18, 2020

(86) PCT No.: PCT/EP2020/073117
§ 371 (c)(1),
(2) Date: Feb. 18, 2022

(87) PCT Pub. No.: WO2021/032747
PCT Pub. Date: Feb. 25, 2021

(65) Prior Publication Data
US 2022/0303582 A1 Sep. 22, 2022

(30) Foreign Application Priority Data
Aug. 19, 2019 (EP) .................................. 19192413

(51) Int. Cl.
*H04N 19/80* (2014.01)
*H04N 19/117* (2014.01)
(Continued)

(52) U.S. Cl.
CPC ........... *H04N 19/80* (2014.11); *H04N 19/117* (2014.11); *H04N 19/188* (2014.11); *H04N 19/44* (2014.11)

(58) Field of Classification Search
CPC .... H04N 19/117; H04N 19/188; H04N 19/44; H04N 19/463; H04N 19/70; H04N 19/80
See application file for complete search history.

(56) References Cited

U.S. PATENT DOCUMENTS

2014/0133547 A1* 5/2014 Tanaka ................... H04N 19/46
375/240.26
2015/0271529 A1* 9/2015 Wang ..................... H04N 19/37
375/240.26

(Continued)

FOREIGN PATENT DOCUMENTS

EP   2 116 059   11/2009
EP   2 735 149    5/2014

(Continued)

OTHER PUBLICATIONS

"Study Text of DIS ISO/IEC 23008-2:201 x High Efficiency Video Coding (4th ed.)", 123. MPEG Meeting; Jul. 16, 2018-Jul. 2, 2018; Ljubljana; (Motion Picture Expert Group or ISO/IEC JTC1/SC29/WG11 ), No. n17728 Sep. 4, 2018 (Sep. 4, 2018), XP030264385.

(Continued)

*Primary Examiner* — Mohammed S Rahaman
(74) *Attorney, Agent, or Firm* — NIXON & VANDERHYE P.C.

(57) ABSTRACT

Video decoder comprising a decoding core (94) configured to reconstruct a decoded picture using motion compensated (Continued)

prediction and transform-based residual decoding from one or more video coding units (100) within an access unit, AU, of a video data stream to obtain a reconstructed version (46*a*) of the decoded picture; an in-loop filter (90) configured to filter the reconstructed version of the decoded picture to obtain a version (46*b*) of the decoded picture to be inserted into the decoded picture buffer (92), DPB, of the video decoder; and a parametrizer configured to parametrize the in-loop filter by reading in-loop filter control information for parametrizing the in-loop filter from one or more parameter sets (102, 104) located within the access unit, AU, of the decoded picture which follow, along data stream order, the one or more video coding units (100), and/or a portion (106) of the one or more video coding units (100) following, along data stream order, data (108) comprised by the one or more video coding units (100), which carries block-based prediction parameter data and prediction residual data, and parametrizing the in-loop filter so as to filter the reconstructed version of the decoded picture in a manner depending on the in-loop filter control information.

8 Claims, 16 Drawing Sheets

(51) Int. Cl.
*H04N 19/169* (2014.01)
*H04N 19/44* (2014.01)

(56) References Cited

U.S. PATENT DOCUMENTS

| | | | | |
|---|---|---|---|---|
| 2016/0286241 | A1* | 9/2016 | Ridge | H04N 19/186 |
| 2020/0389655 | A1* | 12/2020 | Seregin | H04N 19/174 |
| 2021/0392333 | A1* | 12/2021 | Paluri | H04N 19/188 |

FOREIGN PATENT DOCUMENTS

| | | |
|---|---|---|
| EP | 3 205 106 | 8/2017 |
| EP | 3 226 562 | 10/2017 |
| WO | 2008/085909 | 7/2008 |
| WO | 2013/012792 | 1/2013 |
| WO | 2016/057432 | 4/2016 |

OTHER PUBLICATIONS

JVET P0452, "AHB17: Low-delay ALF syntax", Joint Video Experts Team (JVET) of ITU-T SG16 WP 3 and ISO/IEC JTC 1/SC 29/WG 11, 16$^{th}$ Meeting: Geneva, CH, Oct. 1-11, 2019.
Ming Li, et al., "AHG17 & AHG9: Comments on carriage of coding tool parameters in Adaptation Parameter Set", Joint Video Experts Team (JVET) of ISO/IEC JTC1/SC29/WG11, 14$^{th}$ Meeting: Geneva, CH, Document: JVET-N0065, Mar. 11, 2019, 3 pages.
Thomas Rusert, "Inter-layer SPS prediction for HEVC extensions", Joint Collaborative Team on Video Coding (JCT-VC) of ITU-T Sg 16 WP 3 and ISO/IEC .JTC 1/SC 29/WG 11, 12$^{th}$ Meeting: Geneva, CH, Document: JCTVC-L0137, Jan. 7, 2013, 8 pages.
International Search Report for PCT/EP2020/073117 dated Nov. 26, 2020, 6 pages.
Written Opinion of the ISA for PCT/EP2020/073117 dated Nov. 26, 2020, 11 pages.
European Communication Pursuant to Article 94(3) EPC dated Jul. 22, 2022 issued in European Patent Application No. 20754294.5, 15 pp.
Suehring K et al: "Non-CE5/AHG17: Low-delay ALF syntax", 16. JVET Meeting; Oct. 1, 2019-Oct. 11, 2019,; Geneva; (The Joint Video Exploration Team of ISO/IEC JTC1/SC29/WG11 and ITU-T SG. 16 ), No. JVET-P0452 Sep. 25, 2019 (Sep. 25, 2019), XP030217351, Retrieved from the Internet: URL:http://phenix.int-evry.fr/jvet/doc_end_user/documents/16_Geneva/wg11/JVET-P0452-v1 .zip JVET-P0452.docx [retrieved on Sep. 25, 2019], 8 pp.

* cited by examiner

| access_unit_delimiter_rbsp( ) { | descriptor |
|---|---|
| pic_type | u(3) |
| parameter_sets_lists_present_flag | |
| if (parameter_sets_lists_present_flag) { | |
| aud_vps_id | |
| aud_dps_id | |
| aud_sps_id | |
| aud_num_pps_ids_present | |
| for( ppsIdIdx = 0; ppsIdx < aud_num_pps_ids_present; ppsIdIdx ++ ) | |
| aud_pps_id[ppsIdIdx] | |
| aud_num_alf_aps_ids_present | |
| for( alfApsIdIdx = 0; alfApsIdIdx lx < aud_num_alf_aps_ids_present; alfApsIdIdx ++ ) | |
| aud_alf_aps_id[alfApsIdIdx] | |
| aud_num_lmcs_aps_ids_present | |
| for( lmcsApsIdIdx = 0; lmcsApsIdIdx lx < aud_num_lmcs_aps_ ids_present; lmcsApsIdIdx ++ ) | |
| aud_lmcs_aps_id[lmcsApsIdIdx] | |
| aud_num_scal_aps_ids_present | |
| for( scalApsIdIdx = 0; scalApsIdIdx lx < aud_num_scal_aps_ ids_present; scalApsIdIdx ++ ) | |
| aud_scal_aps_id[scalApsIdIdx] | |
| rbsp_trailing_bits() | |
| } | |

Fig. 8

| access_unit_delimiter_rbsp( ) { | descriptor |
|---|---|
|   pic_type | u(3) |
|   aud_num_alf_aps_ids_present | |
|   for( alfApsIdIdx = 0; alfApsIdIdx lx < aud_num_alf_aps_ids_present; alfApsIdx ++ ) | |
|     aud_alf_aps_id[alfApsIdIdx] | |
|   aud_num_lmcs_aps_ids_present | |
|   for( lmcsApsIdIdx = 0; lmcsApsIdIdx lx < aud num_lmcs_aps_ ids_present; lmcsApsIdIdx ++ ) | |
|     aud_lmcs_aps_id[lmcsApsIdIdx] | |
|   aud_num_scal_aps_ids_present | |
|   for( scalApsIdIdx = 0; scalApsIdIdx lx < aud num_scal_aps_ ids_present; scalApsIdIdx ++ ) | |
|     aud_scal_aps_id[scalApsIdIdx] | |
|   rbsp_trailing_bits() | |
| } | |

Fig. 9

| access_unit_delimiter_rbsp( ) { | descriptor |
|---|---|
| pic_type | u(3) |
| aps_ids_in_aud_enabled_flag | |
| if (aps_ids_in_aud_enabled_flag) { | |
|    aud_num_alf_aps_ids_present | |
|    for( alfApsIdIdx = 0; alfApsIdIdx lx < aud_num_alf_aps_ids_present; alfApsIdIdx + + ) | |
|      aud_alf_aps_id[alfApsIdIdx] | |
|    aud_num_alf_lmcs_ids_present | |
|    for( lmcsApsIdIdx = 0; lmcsApsIdIdx lx < aud num_lmcs_aps_ ids_present; lmcsApsIdIdx + + ) | |
|      aud_lmcs_aps_id[lmcsApsIdIdx] | |
|    aud_num_scal_aps_ids_present | |
|    for( scalApsIdIdx = 0; scalApsIdIdx lx < aud num_scal_aps_ ids_present; scalApsIdIdx + + ) | |
|      aud_scal_aps_id[scalApsIdIdx] | |
|    } | |
| rbsp_trailing_bits() | |
| } | |

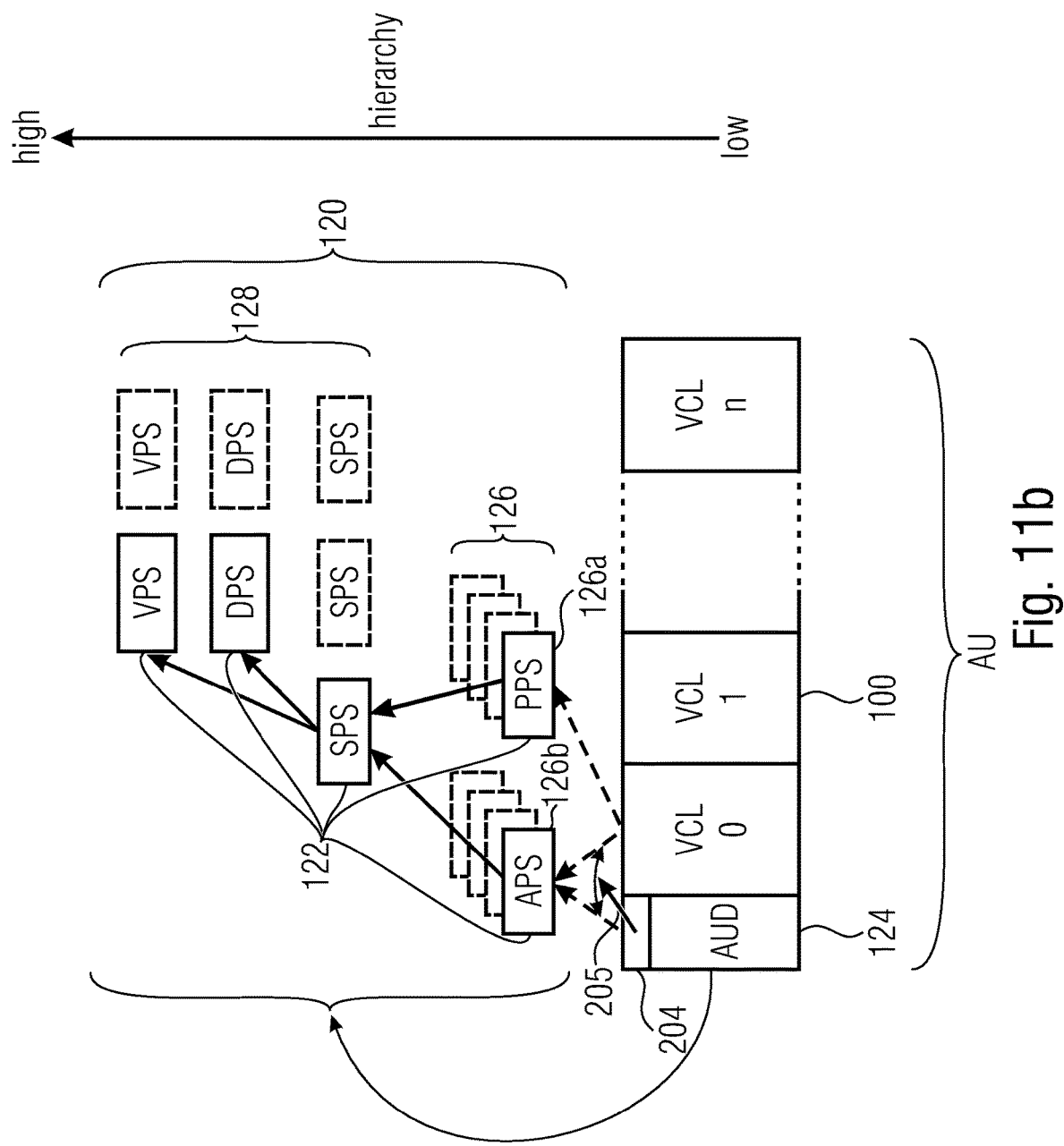

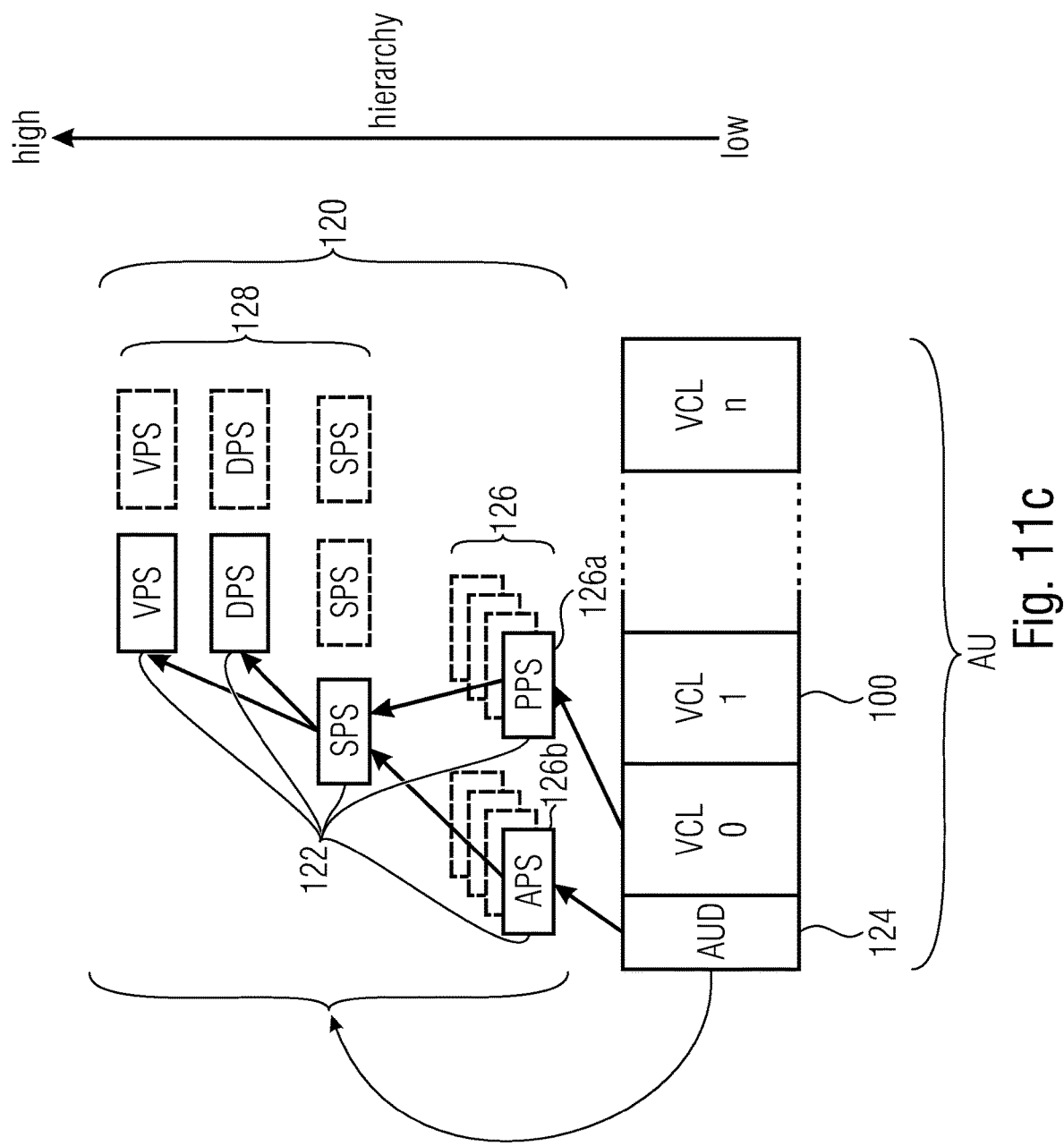

| access_unit_delimiter_rbsp( ) { | | descriptor |
|---|---|---|
|    layer_specific_aud_flag | ~ 300 | u(1) |
|    nal_unit_type_present_flag | ~ 302 | u(1) |
|    if (nal_unit_type_present_flag ) | | |
|       nal_unit_type | | u(5) |
|    discardable_flag | ~ 304 | u(1) |
|    pic_output_flag | ~ 306 | u(1) |
|    rbsp_trailing_bits() | | |
| } | | |

Fig. 12a

| access_unit_delimiter_rbsp( ) { | | descriptor |
|---|---|---|
|    layer_specific_aud_flag | ~ 300 | u(1) |
|    random_access_info_present_flag | ~ 302 | u(1) |
|    if (random_access_info_present_flag ) | | |
|       all_pics_in_au_random_access_flag | | u(1) |
|    discardable_flag | ~ 304 | u(1) |
|    pic_output_flag | ~ 306 | u(1) |
|    rbsp_trailing_bits() | | |
| } | | |

Fig. 12b marked-up part must be referenced as 308

| 308 | access_unit_delimiter_rbsp( ) { | descriptor |
|---|---|---|
| | layer_specific_aud_flag | u(1) |
| | if (layer_specific_aud_flag ) | |
| |    dependent_aud_flag | u(1) |
| |    if (dependent_aud_flag ) | |
| |      aud_inheritance_flag <br> } | u(1) |
| | if(!aud_inheritance_flag \|\| !layer_specific_aud_flag) { | |
| |    nal_unit_type_present_flag | u(1) |
| |    if (nal_unit_type_present_flag ) | |
| |      nal_unit_type | u(5) |
| |    discardable_flag | u(1) |
| |    pic_output_flag <br> } | u(1) |
| | rbsp_trailing_bits() | |
| | } | |

Fig. 13

USAGE OF ACCESS UNIT DELIMITERS AND ADAPTATION PARAMETER SETS

This application is the U.S. national phase of International Application No. PCT/EP2020/073117 filed Aug. 18, 2020 which designated the U.S. and claims priority to EP Patent Application No. 19192413.3 filed Aug. 19, 2019, the entire contents of each of which are hereby incorporated by reference.

The present application is concerned with usage of access delimiters and adaptation parameter sets for signalling coding parameters.

Modern video coding standards make use of in-loop filters like Adaptive Loop Filter (ALF), Sample Adaptive Offset (SAO) and deblocking filter.

In-loop filters are located in the decoding loop of the encoder. During all the video coding stages and especially in the lossy compression performed in the quantization stage, the subjective quality of a video sequence can be reduced resulting in the appearance of blocking, ringing or blurring artifacts. In order to remove these artifacts, and increase the subjective and objective quality of the reconstructed sequence, a set of in-loop filters are used. In-loop filters in the encoder estimate the optimal filter parameters that increase the objective quality of a frame the most. These parameters are then transmitted to the decoder so that the in-loop filters of the decoder can use these parameters to optimally filter the reconstructed frame and achieve the same quality improvements reached for the reconstructed frame in the encoder.

The deblocking filter aims to remove the blocking artifacts that appear in the edge of CUs (coding units), and specifically PUs (prediction units) and TUs (transform units), as a consequence of using a block structure in the processing of every stage of the encoder.

The SAO filter aims to reduce undesirable visible artifacts such as ringing. The key idea of SAO is to reduce sample distortion by first classifying reconstructed samples into different categories, obtaining an offset for each category, and then adding the offset to each sample of the category.

The key idea of ALF is to minimize the mean square error between original pixels and decoded pixels using Wiener-based adaptive filter coefficients. ALF is located at the last processing stage of each picture and can be regarded as a tool trying to catch and fix artifacts from previous stages. The suitable filter coefficients are determined by the encoder and explicitly signalled to the decoder. That is, the ALF requires a set of parameters, i.e., the suitable filter coefficients, to be sent to the decoder. These parameters are sent in a high-level syntax structure, e.g. the Adaptation Parameter Set (APS). An APS is a parameter set that is sent in the bitstream before the Video Coding Layer (VCL) NAL (network abstraction layer) units, i.e. the slices of a picture. ALF is applied to the complete picture after reconstruction. Also, at the encoder, ALF estimation is one of the last steps in the encoding process.

In low-delay environments this causes a problem, because the encoder wants to start sending the processed parts of the picture as soon as possible, especially before finishing the encoding process of the picture. ALF cannot be used optimally in these environments, because the APS with the filter parameters estimated for the encoded picture have to be sent before the first slice of the picture.

In addition, a set of NAL units in a specified form is referred to as an access unit, AU, and the decoding of each AU results in one decoded picture. Each AU contains a set of VCL NAL units that together compose a primary coded picture. It may also be prefixed with an access unit delimiter (AUD) to aid in locating the start of the AU.

The AUD is used to separate AUs in the bitstream. It can optionally contain information about the following picture, like the allowed slice types (I, P, B).

In Versatile Video Coding, WC, several different parameter sets may be referred to by a picture: Video Parameter Set (VPS), Decoder Parameter Set (DPS), Sequence Parameter Set (SPS), multiple Picture Parameter Sets (PPS) and different types of Adaptation Parameter Sets (APS), also more than one. A decoder needs to have all the parameter sets available to be able to decode a picture.

Different slices of a picture may refer to different PPSs and APSs. Thus, it may be hard to determine for a decoder whether all required parameter sets are available, because it needs to parse all slice headers of the picture and decode, which parameter are referred to.

The object of the subject-matter of the present application is to provide a decoder which derives necessary parameters from access unit.

This object is achieved by the subject-matter of the claims of the present application.

In accordance with embodiments of the present application, a video decoder comprises a decoding core (94) configured to reconstruct a decoded picture, e.g., a currently decoded picture or a following decoded picture, using motion compensated prediction and transform-based residual decoding from one or more video coding units (100), e.g., VCL NAL unit, within an access unit, AU, of a video data stream to obtain a reconstructed version (46*a*) of the decoded picture; an in-loop filter (90), e.g. including ALF, configured to filter the reconstructed version of the decoded picture to obtain a version (46*b*) of the decoded picture to be inserted into the decoded picture buffer (92), DPB, of the video decoder; and a parametrizer configured to parametrize the in-loop filter by reading in-loop filter control information, e.g., ALF coefficients (or parameters) and ALF per CTU (coding tree unit) flags, for parametrizing the in-loop filter from one or more parameter sets (102, 104), e.g., ALF APS and ALF per CTU APS, located within the access unit, AU, of the decoded picture which follow, i.e., individually with the VCL NALUs or following all of them, along data stream order, the one or more video coding units (100), and/or a portion (106), e.g., ALF per CTU data, of the one or more video coding units (100) following, along data stream order, data (108) comprised by the one or more video coding units (100), which carries block-based prediction parameter data and prediction residual data, and parametrizing the in-loop filter so as to filter the reconstructed version of the decoded picture in a manner depending on the in-loop filter control information. That is, the in-loop filter control information is derived for one or more video coding unit, and, therefore, it is possible to start decoding before receiving all the video coding unit of a picture. Hence, the decoding delay is reduced in low-delay environments.

In accordance with embodiments of the present application, the in-loop filter control information comprises one or more filter coefficients for parametrizing the in-loop filter in terms of transfer function. That is, the ALF is, for instance, a FIR (finite impulse response) or IIR (infinite impulse response) filter and the filter coefficients FIR or IIR coefficients which control the filter's transfer function.

In accordance with embodiments of the present application, the in-loop filter control information comprises spatially selective in-loop filter control information for spatially varying the filtering of the reconstructed version of the decoded picture, e.g., the currently decoded picture or the following decoded picture, by the in-loop filter.

In accordance with embodiments of the present application, each video coding unit (100) is continuously arithmetically coded along the data stream order across the data to the end of the portion (106), that is, the ALF. A predetermined parameter set (102) of the one or more parameter sets follows each of the one or more video coding units (100) in data stream order and comprises one or more filter coefficients for parametrizing the in-loop filter in terms of transfer function.

In accordance with embodiments of the present application, the one or more parameter sets (104) comprise for each of the one or more video coding units (100) a further predetermined parameter set which follows in data stream order the respective video coding unit (100) and comprises spatially selective in-loop filter control information for spatially varying the filtering of the reconstructed version of the decoded picture, e.g., the currently decoded picture or the following decoded picture, by the in-loop filter within a portion of the picture which is encoded into the respective video coding unit (100).

In accordance with embodiments of the present application, each of the one or more video coding units (100) comprises a filter information section (106) which follows in data stream order a data section (108) of the respective video coding unit (100) wherein the filter information section comprises spatially selective in-loop filter control information for spatially varying the filtering of the reconstructed version of the decoded picture, e.g., the currently decoded picture or the following decoded picture, by the in-loop filter within a portion of the picture for which block-based prediction parameter data and prediction residual data is encoded into the data section of the respective video coding unit (100).

In accordance with embodiments of the present application, the parametrizer may be configured to locate the one or more parameter sets (102, 104), e.g., ALF APS and ALF per CTU APS, within the access unit, AU, of the decoded picture, e.g., the currently decoded picture or the following decoded picture, at a position which follows, i.e., individually with the VCLs or following all of them, along data stream order, the one or more video coding units (100), in case of a predetermined indication in the video data stream assuming a first state, and at a different position within the access unit which precedes all of the one or more video coding units (100) in case of the predetermined indication in the video data stream assuming a second state.

In accordance with embodiments of the present application, the portion (106), e.g., ALF per CTU data, of the one or more video coding units (100) at a position following, along data stream order, data (108) comprised by the one or more video coding units (100), which carries block-based prediction parameter data and prediction residual data, in case of a predetermined indication in the video data stream assuming a first state, and at a different positions within the one or more video coding units which are interspersed with the block-based prediction parameter data and prediction residual data, in case of the predetermined indication in the video data stream assuming a second state.

In accordance with embodiments of the present application, the video decoder is configured to read the predetermined indication from the one or more video coding units (100). The predetermined indication indicates, in case of assuming the first state, the one or more parameter sets by one or more identifier, and, in case of assuming the second state, different one or more in-loop filter control information parameter sets. The video decoder is configured to be responsive to the predetermined indication on a per access unit basis so as to perform locating differently for different access units of the video data stream in case of the predetermined indication being different for the different access units. The parametrizer is configured to reconstruct the decoded picture using the in-loop filter control information included in the previously signalled access unit, AU.

In accordance with embodiments of the present application, the video decoder is configured to, in detecting the boundaries of access unit, AU, interpret video coding units carrying the in-loop filter control information, e.g. the ALF filter data, in the form of one or more of parameter sets (102, 104), e.g. suffix APS, as not starting an access unit, AU, therefrom, e.g. ignoring them in AU boundary detection and thereby detecting absence of an AU boundary, and interpret video coding units carrying the in-loop filter control information not in the form of one or more of parameter sets (102, 104), e.g. prefix APS, as starting an access unit therefrom, e.g. detecting an AU boundary from such video coding units.

In accordance with embodiments of the present application, the video decoder is configured to decode a video from a video data stream by decoding a decoded picture, e.g., a currently decoded picture or a following decoded picture, from one or more video coding units (100) within an access unit, AU, of the video data stream in a manner parametrized using one or more predetermined coding parameters; derive the predetermined coding parameters (122) from a plurality of parameter sets (120) which are interspersed into video data stream, read identifiers (200) from a predetermined unit (124) of the access unit, AU, which identify predetermined parameter sets out of the plurality of parameter sets, which comprise the predetermined coding parameters. That is, presence or absence of the coding parameter is indicated by the identifiers, and, hence, it is efficiently recognized which parameter set is derivable from the received video coding unit. Furthermore, the identifiers are included in the predetermined unit of the AU, and, therefore, it is easy to include different parameter set for a different video coding unit.

In accordance with embodiments of the present application, the predetermined unit of the AU comprises a flag (204) indicative of whether the identifiers (200) are present in the predetermined unit or not. That is, it is possible to indicate by the flag which identifiers are included in the predetermined unit of the AU, e.g., an access unit delimiter.

In accordance with embodiments of the present application, the plurality of parameter sets (120) are of different hierarchy levels, wherein the one or more video coding units comprise, e.g. in a slice header, identifiers which refer to first predetermined parameter sets (126) within one or more first predetermined hierarchy levels, wherein the first predetermined parameter sets (126) within the one or more first predetermined hierarchy levels comprise identifiers which refer to second predetermined parameter sets (128) within one or more second predetermined hierarchy levels, the first and second predetermined parameter sets being contained by the predetermined parameter sets (122). The identifiers read from the predetermined unit (124) of the access unit, AU, identify all predetermined parameter sets directly or indirectly referred to by the one or more video coding units of the access unit so that, if all predetermined parameter sets identified by the identifiers are available, the access unit is decodable.

In accordance with embodiments of the present application, the predetermined unit of the AU comprises a flag (204) indicative (205) of whether either; predetermined identifiers of the identifiers (200) which refer to specific predetermined parameter sets (126b), e.g., specific APSs, are present in the predetermined unit (124), or the predetermined identifiers which refer to the specific predetermined parameter sets (126b) are present in the one or more video coding units (100).

In accordance with embodiments of the present application, the first predetermined parameter sets (126) comprise third predetermined parameter sets (126a) which are referred to by identifiers in the one or more video coding units (100), and fourth predetermined parameter sets (126b) which are referred to by identifiers (200) present in the predetermined unit (124), but are neither referred to by any of the identifiers in the one or more video coding units (100), nor by any of the predetermined parameter sets.

In accordance with embodiments of the present application, the predetermined unit of the AU comprises one or more of one or more identifiers of one or more adaptive parameter sets, APSs, one or more identifiers of one or more picture parameter sets, PPSs, an identifier for a video parameter set, VPS, an identifier for a decoder parameter set, DPS, and one or more identifiers of one or more sequence parameter sets, SPS. The plurality of parameter sets comprises a video parameter set, VPS, a decoder parameter set, DPS, a sequence parameter set, SPS, one or more picture parameter sets, PPSs, and one or more adaptive parameter sets, APSs.

In accordance with embodiments of the present application, a video decoder configured to decode a video from a video data stream by decoding pictures from one or more video coding units (100) of access units, AUs, of the video data stream; read one or more parameters from access unit delimiters, AUD, which are arranged in the data stream so as to form the start of the access units, AUs, the one or more parameters controlling (300) whether separate access units are defined in the video data stream for pictures relating to one time instant but different layers of the video data stream, or whether the pictures relating to one time instant but different layers of the video data stream are coded into one of the access units, and/or indicating (302) a video coding type of video coding units comprised in the access units which is to be assigned to video coding units within one access units in case of a video coding type indication contained the video coding units within the one access unit differing from each other, and/or indicating (304) pictures of which access units are not referenced by any other picture, and/or indicating (306) pictures not to be output. That is, the parameters required to decode a picture is indicated by the AUD, and, therefore, it is possible to start decoding a slice of the picture included in the AU before obtaining all the parameter sets for decoding the complete picture. In other words, the parameter sets required for each slice are efficiently indicated by the AUD, and, hence, it is possible to improve decoding speed.

In accordance with embodiments of the present application, the one or more parameters form a deviation relative to parameters defined by a previous AUD. The AUD comprises an indication whether parameters defined by a previous AUD are to be adopted. The AUD comprises an indication whether the one or more parameters apply to all layers of the video data stream or to a single layer thereof only. The video coding type of the video coding units is indicated by describing a random access property of a multiple pictures.

In accordance with embodiments of the present application, a video decoder configured to decode a video from a video data stream by decoding pictures from one or more video coding units (100) of access units, AUs, of the video data stream; read one or more parameters (308) from access unit delimiters, AUD, which are arranged in the data stream so as to form the start of the access units, AUs, the one or more parameters indicating a characteristic of the access unit, and an indication whether the characteristic applies to all layers of the video data stream or to a single layer thereof only.

In accordance with embodiments of the present application, a method comprising reconstructing a decoded picture, e.g., a currently decoded picture or a following decoded picture, using motion compensated prediction and transform-based residual decoding from one or more video coding units (100), e.g., VCL NAL unit, within an access unit, AU, of a video data stream to obtain a reconstructed version of the decoded picture; filtering the reconstructed version of the decoded picture to obtain a version of the decoded picture to be inserted into the decoded picture buffer, DPB, of the video decoder by using an in-loop filter; and parametrizing the in-loop filter by reading in-loop filter control information for parametrizing the in-loop filter from one or more parameter sets (102, 104), e.g., ALF APS and ALF per CTU APS, located within the access unit, AU, of the decoded picture which follow, along data stream order, the one or more video coding units (100), and/or a portion (104), e.g., ALF per CTU data, of the one or more video coding units (100) following, along data stream order, data comprised by the one or more video coding units (100), which carries block-based prediction parameter data and prediction residual data, so as to filter the reconstructed version of the decoded picture in a manner depending on the in-loop filter control information.

In accordance with embodiments of the present application, a method comprising decoding a video from a video data stream by decoding a decoded picture, e.g., a currently decoded picture or a following decoded picture, from one or more video coding units (100) within an access unit, AU, of the video data stream in a manner parametrized using one or more predetermined coding parameters; deriving the predetermined coding parameters from a plurality of parameter sets which are interspersed into video data stream, reading identifiers (200) from a predetermined unit of the access unit, AU, which identify predetermined parameter sets out of the plurality of parameter sets, which comprise the predetermined coding parameters.

In accordance with embodiments of the present application, a method comprising decoding a video from a video data stream by decoding pictures from one or more video coding units (100) of access units, AUs, of the video data stream; reading one or more parameters from access unit delimiters, AUD, which are arranged in the data stream so as to form the start of the access units, AUs, the one or more parameters controlling (300) whether separate access units are defined in the video data stream for pictures relating to one time instant but different layers of the video data stream, or whether the pictures relating to one time instant but different layers of the video data stream are coded into one of the access units, indicating (302) a video coding type of video coding units comprised in the access units which is to be assigned to video coding units within one access units in case of a video coding type indication contained the video coding units within the one access unit differing from each other, and/or indicating (304) pictures of which access units are not referenced by any other picture, and/or indicating (306) pictures not to be output.

In accordance with embodiments of the present application, a method comprising decoding a video from a video data stream by decoding pictures from one or more video coding units (100) of access units, AUs, of the video data stream; reading one or more parameters (308) from access unit delimiters, AUD, which are arranged in the data stream so as to form the start of the access units, AUs, the one or more parameters indicating a characteristic of the access unit, and an indication whether the characteristic applies to all layers of the video data stream or to a single layer thereof only.

Preferred embodiments of the present application are described below with respect to the figures, among which:

FIG. 8 shows a diagram indicating an example of information regarding parameter set identifiers, IDs, included in an access unit delimiter, AUD, according to embodiments of the present application;

FIG. 9 shows a diagram indicating an example of information regarding a predetermined parameter set included in the AUD according to embodiments of the present application;

FIG. 10 shows a diagram indicating an example of information regarding a predetermined parameter set included in the AUD according to embodiments of the present application;

FIG. 11b shows a schematic illustration of an example indicating which part of the AU indicates which identifier of which parameter set according to embodiments of the present application;

FIG. 11c shows a schematic illustration of another example indicating which part of the AU indicates which identifier of which parameter set according to embodiments of the present application;

FIG. 12a, 12b shows a diagram indicating an example of parameter included in the AUD according to embodiments of the present application; and FIG. 13 shows a diagram indicating another example of parameter included in the AUD according to embodiments of the present application.

Figure 1:
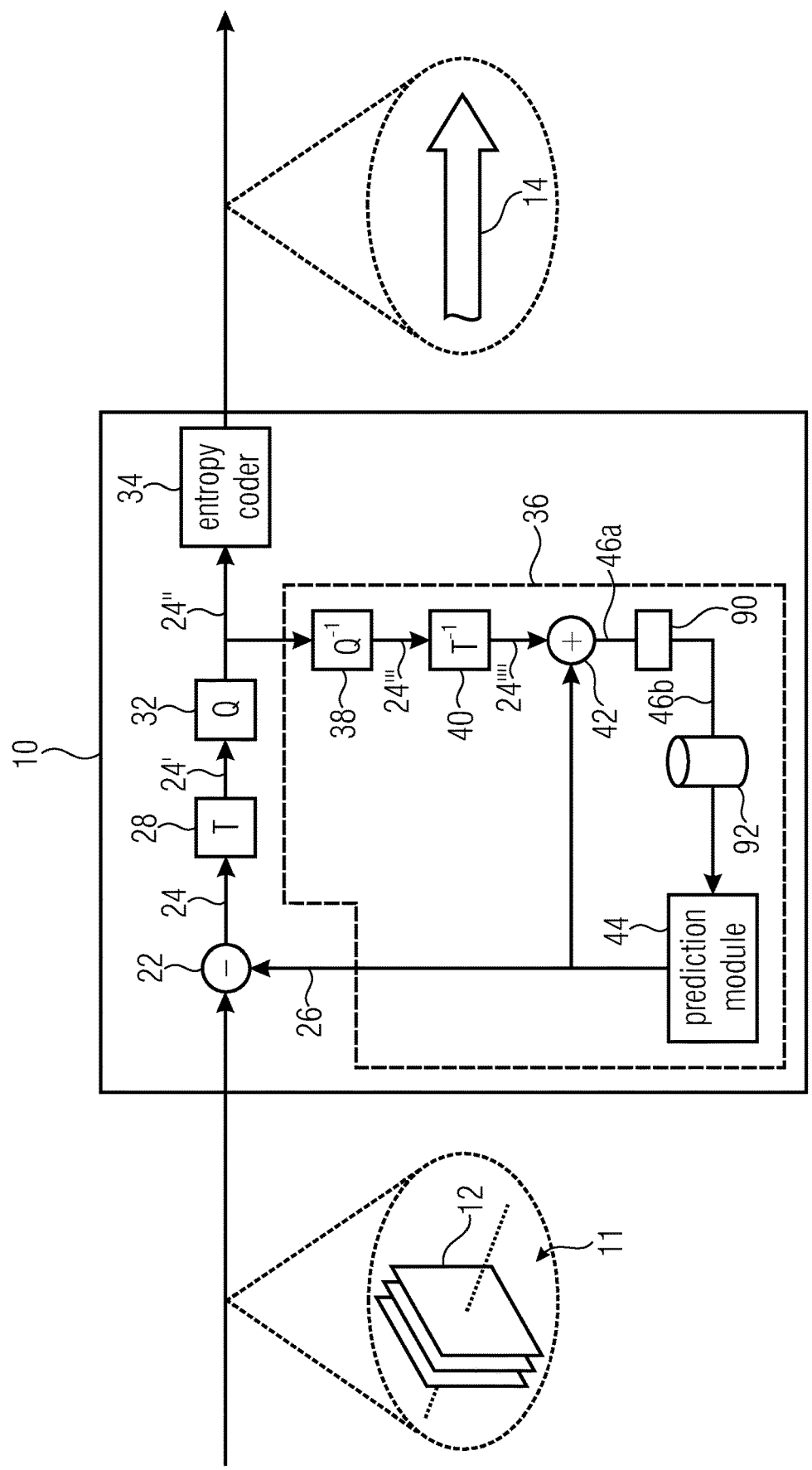
FIG. 1 shows a block diagram of an apparatus for predictively encoding a video as an example for a video encoder where a layered video data stream according to embodiments of the present application could be encoded.

Equal or equivalent elements or elements with equal or equivalent functionality are denoted in the following description by equal or equivalent reference numerals.

In the following description, a plurality of details is set forth to provide a more thorough explanation of embodiments of the present application. However, it will be apparent to one skilled in the art that embodiments of the present application may be practiced without these specific details. In other instances, well-known structures and devices are shown in block diagram form rather than in detail in order to avoid obscuring embodiments of the present application. In addition, features of the different embodiments described hereinafter may be combined with each other, unless specifically noted otherwise.

INTRODUCTORY REMARKS

In the following, it should be noted that individual aspects described herein can be used individually or in combination. Thus, details can be added to each of said individual aspects without adding details to another one of said aspects.

It should also be noted that the present disclosure describes, explicitly or implicitly, features usable in a video decoder (apparatus for providing a decoded representation of a video signal on the basis of an encoded representation). Thus, any of the features described herein can be used in the context of a video decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

The following description of the figures starts with a presentation of a description of video encoder and video decoder of a block-based predictive codec for coding pictures of a video in order to form an example for a coding framework into which embodiments for a layered video data stream codec may be built in. The video encoder and video decoder are described with respect to FIGS. 1 to 3. Thereinafter the description of embodiments of the concept of the layered video data stream codec of the present application are presented along with a description as to how such concepts could be built into the video encoder and decoder of FIGS. 1 and 2, respectively, although the embodiments subsequently described, may also be used to form video encoder and video decoders not operating according to the coding framework underlying the video encoder and video decoder of FIGS. 1 and 2.

FIG. 1 shows a block diagram of an apparatus for predictively coding a video as an example for a video decoder where a motion compensated prediction for inter-predicted blocks according to embodiments of the present application could be implemented. That is, FIG. 1 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10.

Figure 2:
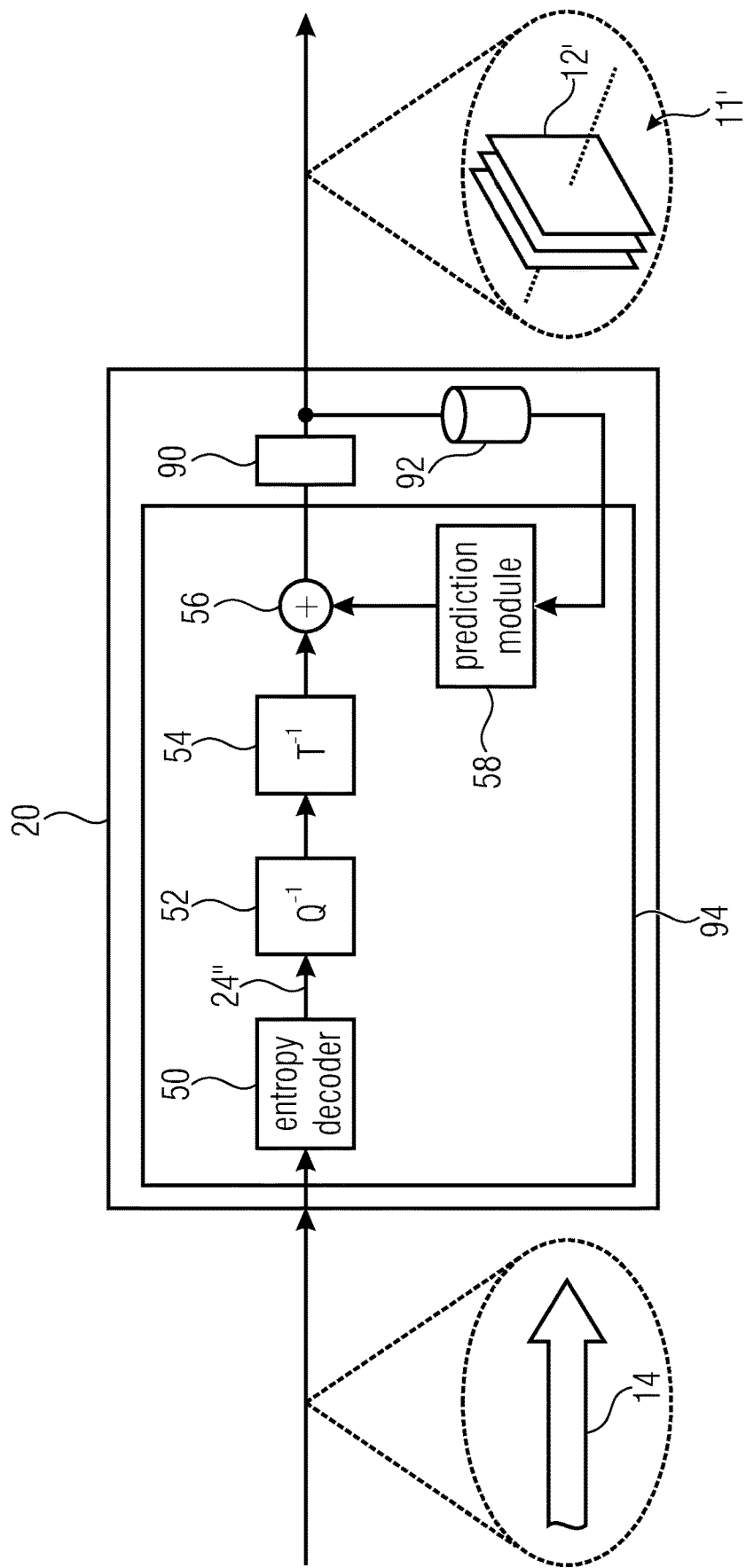
FIG. 2 shows a block diagram of an apparatus for predictively decoding a video, which fits to the apparatus of FIG. 1, as an example for a video decoder where a layered video data stream according to embodiments of the present application could be decoded.

FIG. 2 shows a block diagram of an apparatus for predictively decoding a video as an example for a video decoder where a motion compensated prediction for inter-predicted blocks according to embodiments of the present application could be implemented. That is, FIG. 2 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into data stream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into and decodable from, data stream 14. To this end, the prediction stage 36 may internally comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'' so as to obtain a reconstructed signal 46a, i.e. a reconstruction of the original signal 12 (reconstructed version). Reconstructed signal 46a may correspond to signal 12'.

An in-loop filter 90 filters the reconstructed signal 46a to obtain a version of the decoded picture, e.g., the currently decoded picture or the following decoded picture, decoded signal 46b, to be inserted into the decoded picture buffer, DPB, 92.

A prediction module 44 of prediction stage 36 then generates the prediction signal 26 on the basis of signal 46b by using, for instance, spatial prediction, i.e. intra prediction, and/or temporal prediction, i.e. inter prediction. Details in this regard are described in the following.

The decoder 20 comprises a decoding core 94 comprising an entropy decoder 50, a dequantizer 52, an inverse transformer 54, combiner 56 and a prediction module 58, and an in-loop filter 90 and a DPB 94.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 3, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes which form a kind of set or pool of primitive prediction modes based on which the predictions of picture blocks are composed in a manner described in more detail below. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter. According to intra-coding mode, a prediction signal for a block is obtained on the basis of a spatial, already coded/decoded neighbourhood of the respective block. Several intra-coding sub-modes may exist the selection among which, quasi, represents a kind of intra prediction parameter. There may be directional or angular intra-coding sub-modes according to which the prediction signal for the respective block is filled by extrapolating the sample values of the neighbourhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighbouring samples. Compared thereto, according to inter-prediction mode, a prediction signal for a block may be obtained, for instance, by temporally predicting the block inner. For parametrization of an inter-prediction mode, motion vectors may be signalled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24", data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signalling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Figure 3:
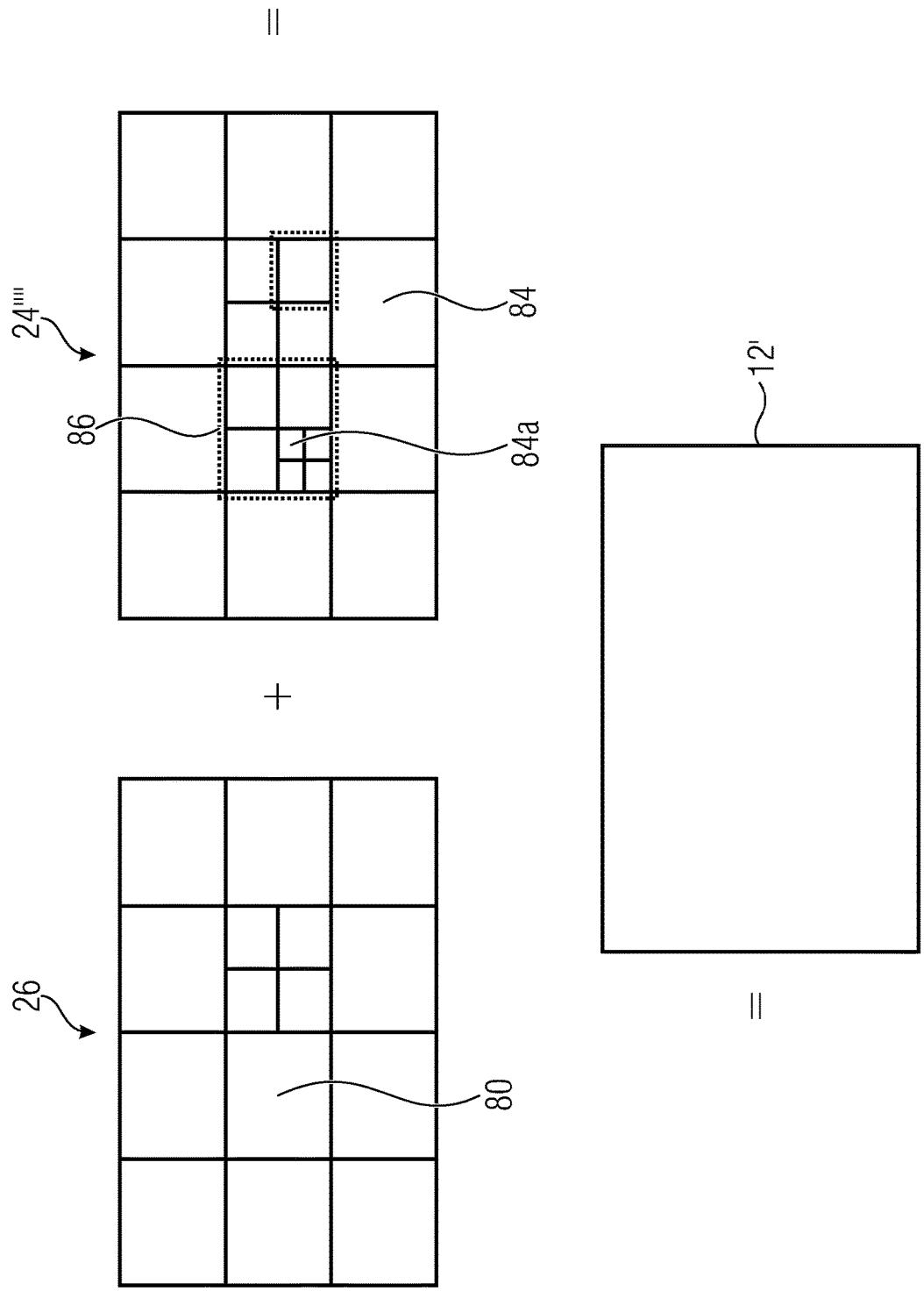
FIG. 3 shows a schematic diagram illustrating an example for a relationship between a prediction residual signal, a prediction signal and a reconstructed signal so as to illustrate possibilities of setting subdivisions for defining the prediction signal, handling the prediction residual signal and the like, respectively.

FIG. 3 shows a schematic diagram illustrating an example for a relationship between a prediction residual signal, a prediction signal and a reconstructed signal so as to illustrate possibilities of setting subdivisions of defining the prediction signal, handling the prediction residual signal and the like, respectively. That is, FIG. 3 illustrates the relationship between the reconstructed signal, i.e. the reconstructed picture 12', on the one hand, and the combination of the prediction residual signal 24" as signalled in the data stream, and the prediction signal 26, on the other hand. As already denoted above, the combination may be an addition. The prediction signal 26 is a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof where the picture area is firstly subdivided into rows and columns of tree-root blocks which are then further subdivided in accordance with a recursive multi-tree subdivisioning to result into blocks 80.

In the following each aspect of the present invention of the present application is explained.

Suffix-APS

According to one aspect of the present invention of the present application, it makes possible an encoder to start sending parts of the picture (e.g. slices) before finishing the encoding process of the whole picture, while still using slices. This is achieved by allowing an Adaptation Parameter Set (APS) to be sent after the coded slices of a picture moving per-CTU (Coding Tree Unit) ALF parameters behind the actual slice data.

Figure 4:
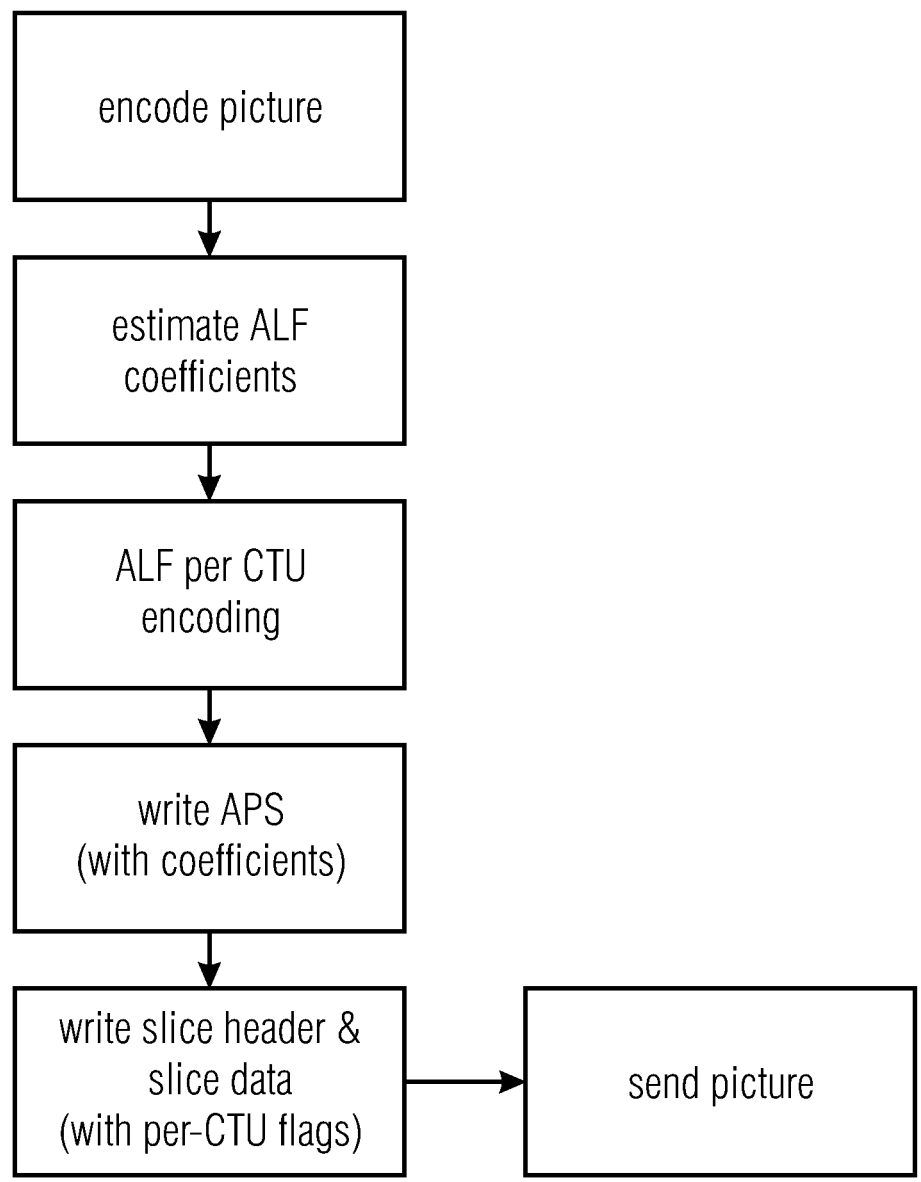
FIG. 4 shows a schematic illustration of an example for an encoding process according to the prior art.

FIG. 4 shows an illustration of a state-of-the-art encoder. First the whole picture is encoded (intra-prediction, motion estimation, residual encoding, etc.), then the ALF estimation process is started. ALF filter coefficients are written to the APS, then the slice data can be written including ALF per CTU parameters (which are interspersed with other parameters). The picture can only be sent after the ALF encoding is finished.

Figure 5:
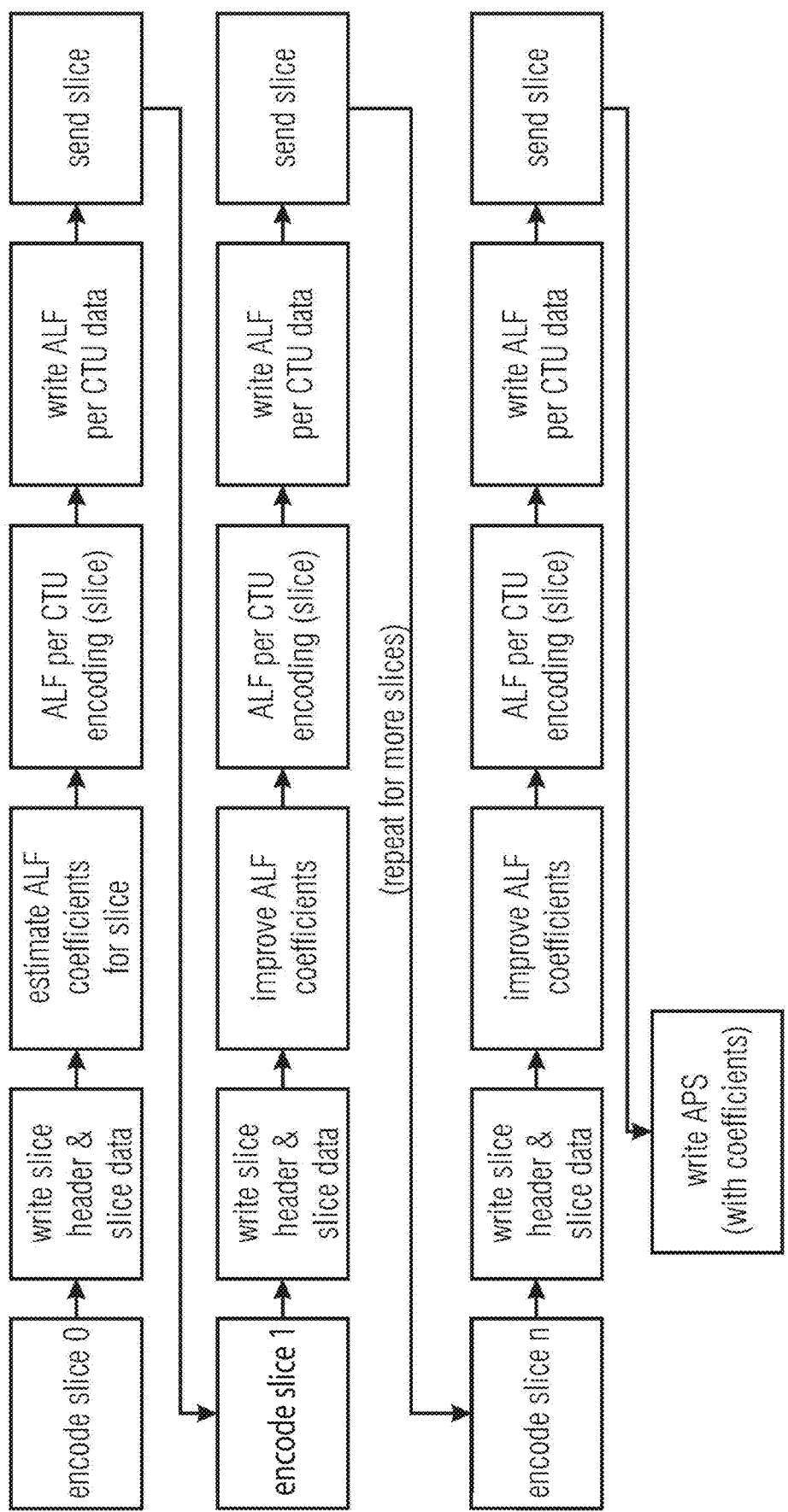
FIG. 5 shows a schematic illustration of an example for an encoding process to signal a picture to a decoder according to embodiments of the present application.

FIG. 5 shows an example of a low-delay encoder envisioned by this invention. Slices can be sent out before the picture encoding process is finished. Especially the APS carrying the coefficients is moved behind the slice data (VCL NAL units).

In this process, the encoder can send out the coded slices of the picture first, while collecting the estimated ALF parameters (filter coefficients, filter control information) and then the APS containing the ALF parameters after the coded picture. The decoder can start parsing and decoding the slices of the picture, as soon as they arrive. Since ALF is one of the last decoding steps, the ALF parameters can arrive after the coded picture to be applied after the other decoding steps.

The invention includes the following aspects:

An APS type, that indicates that the APS belongs to the previous picture.

The APS type is coded in a syntax element. Embodiments are:

a new NAL unit type (e.g. suffix APS) coded in the NAL unit header a new APS type (e.g. suffix ALF APS) coded in the APS a flag, which indicates whether the APS applies to the previous or the following picture.

A change in decoding process, which only assumes the beginning of a new Access Unit, AU, by a signalled prefix APS, not a suffix APS.

Alternatively, the APS type (prefix or suffix) could be determined by the relative position in the bitstream with respect to the surrounding Access Unit Delimiters (AUDs) and coded slices of a picture:

if an APS is located between the last VCL NAL unit of a picture and the AUD, it is applied to the previous picture.

if an APS is located between the AUD and the first VCL NAL unit of a picture, it is applied to the following picture.

In this case, a decoder should only determine the beginning of a new Access Unit by the location of the AUD.

In one embodiment, the slice header indicates that a suffix APS is used instead of a prefix APS, so that the dependency is solved at the end of the decoding process of a picture, e.g. by:

signalling the APS identifier at a position in the slice header depending on its prefix or suffix property.

signalling a flag indicating that the referenced APS will follow the coded slices in bitstream order.

Typically, not only the derivation the ALF parameters (filter coefficients) is carried out towards the end of the encoding process (based reconstructed sample values), but also further ALF control information (info regarding whether a Coding Tree Unit, CTU, is filtered or not and how it is filtered) is derived at this stage. The ALF control information is carried in several syntax elements per coding_tree_unit in the slice payload, interspersed with the block splitting (e.g., as indicated in FIG. 6b), transform coefficients and so on. For instance, the following syntax elements might be present:

alf_ctb_flag: specifies whether the adaptive loop filter is applied to the Coding Tree Block, CTB.

alf_ctb_use_first_aps_flag: specifies whether the filter information in APS with adaptive_parameter_set_id equal to slice_alf_aps_id_luma[0] is used.

alf_use_aps_flag: specifies whether a filter set from an APS is applied to the luma CTB.

etc.

All this ALF control information depends on the derivation of the filter parameters of ALF towards the end of the encoding process of a picture.

In one embodiment, the ALF control information is signalled in a separate loop over the CTUs of a slice at the end of the respective slice payload so that an encoder can finalize the first part of the slice payload (transform coefficients, block structure, etc.) before ALF is carried out. This embodiment is illustrated in FIGS. 6a and 6b.

Figure 6A:
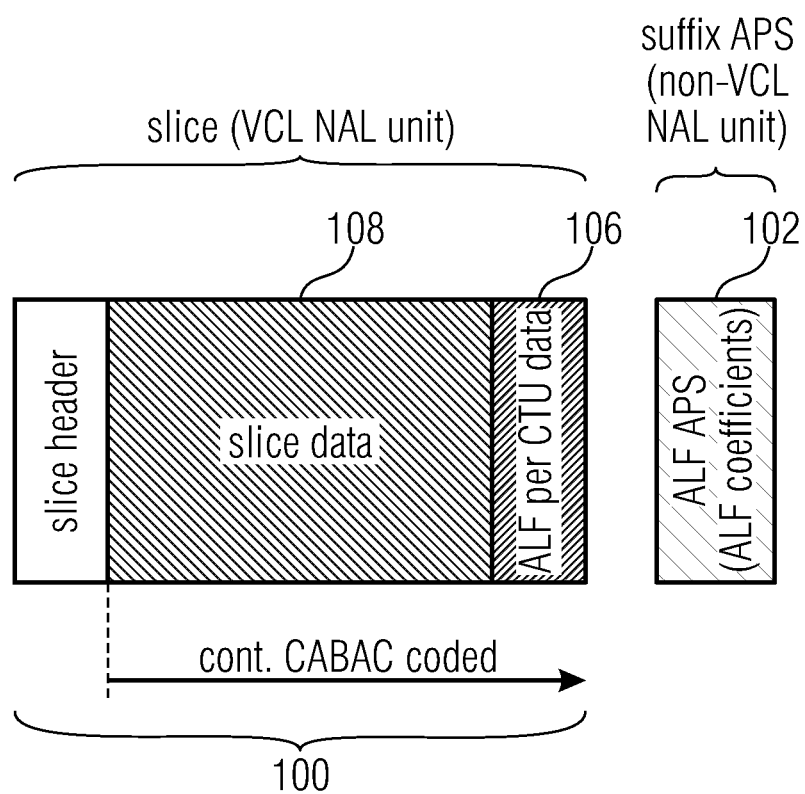
FIGS. 6a, 6b shows a schematic illustration of an example of an access unit, AU, according to embodiments of the present application.
Figure 6B:
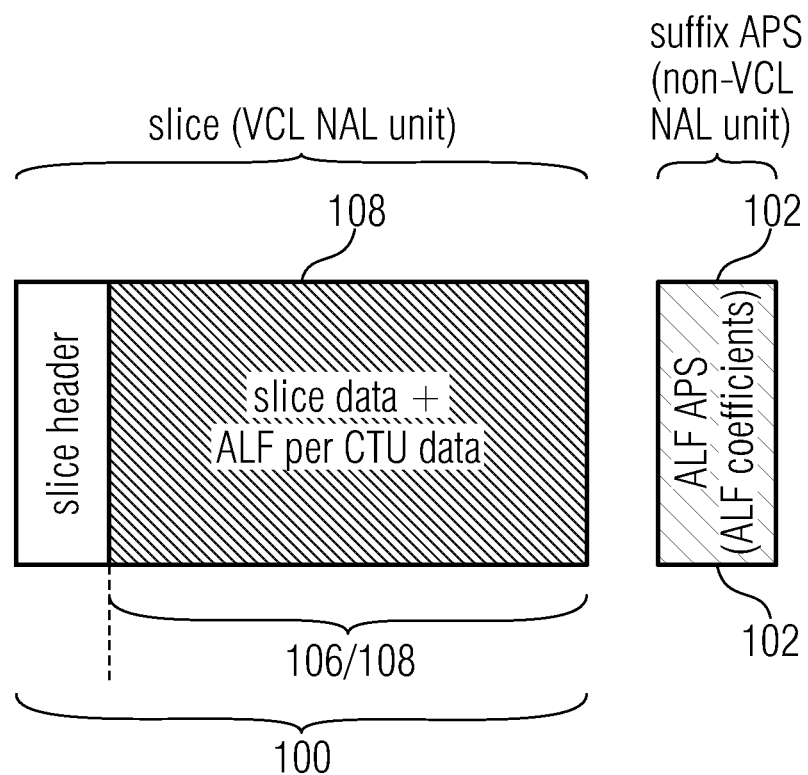

As indicated in FIG. 6a, a video coding unit (VCL NAL unit) 100 comprises a slice header, slice data 108 and a portion (ALF per CUT APS) 106, and one or more parameter set (ALF coefficients) 102 is separately signalled, i.e., as a suffix APS (in a non-VCL-NAL unit). That is, each video coding unit 100 is continuously arithmetically coded along the data stream order across the data to the end of the portion.

FIG. 6b shows that the portion 106 is interspersed with the slice data 108. That is, ALF per CUT APS is interspersed with the block and one or more parameter set 102 is separately signalled as a suffix APS.

In another embodiment, the slice header would indicate that the ALF control information are not indicated in the syntax elements within the coded slice payload, i.e. in the above described CTU loop, but that the ALF control information is included into the suffix APS, i.e. in a separate loop over all CTUs in the respective suffix APS, e.g. through the referred to APS being of a suffix APS type.

In another embodiment, the slice header would indicate that the ALF control information are not indicated in the syntax elements within the coded slice payload, i.e. in the above described CTU loop, but that the ALF control information is included into a new type of suffix APS, which is different from the suffix APS that carries the ALF coefficients, i.e. in a separate loop over all CTUs in the respective suffix APS, e.g. through the referred to APS being of a suffix APS type. The per-CTU data can optionally be CABAC encoded. This embodiment is illustrated in FIG. 7.

Figure 7:
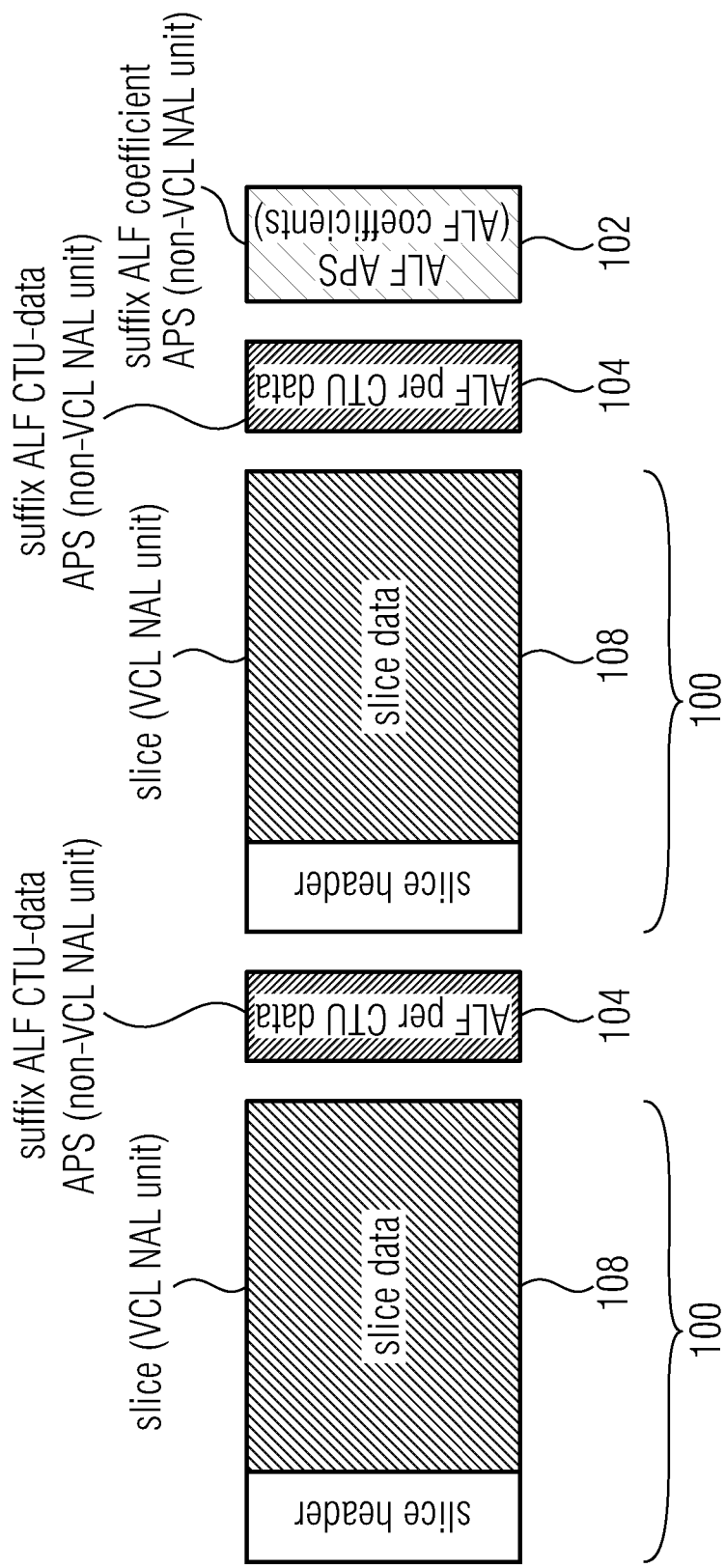
FIG. 7 shows a schematic illustration of an example of another AU according to embodiments of the present application.

As indicated in FIG. 7, data units are signalled in a data stream order, a video coding unit (VCL NAL unit) 100 including a slice header and a slice data 108, a parameter set 104 (Suffix ALF CTU-data APS: non-VCL NAL unit), a further video coding unit 100, a further parameter set 104, and a parameter set (filter control information) 102 (Suffix ALF coefficient APS: non-VCLNAL unit). That is, contrary to the data stream indicated in FIGS. 6a and 6b, the filter coefficients are not necessary to be signalled following every video coding unit. In other words, the filter coefficients may be sent collectively for more than one video coding unit 100 following them in bitstream order or be further used by further video coding units following the filter coefficients in bitstream order.

In another embodiment, the slice header that refers to a suffix APS and all CTUs are inferred to having the adaptive loop filter applied with the filter parameters signalled in the suffix APS and default values for the ALF control information.

Signalling of Referred to Parameter Set IDs in AUD

In the following, to another aspect of the present invention of the present application, i.e., a method for easier access to a list of all parameter sets that are referred to in the picture is described.

According to this aspect of the present invention of the present application, a decoder can easily determine, if all necessary parameter sets are available before starting to decode.

A list of all used parameter sets is included in a high-level syntax structure.
The list consists of
one VPS (Video Parameter Set)
one DPS (Decoder Parameter Set)
one or more SPS (Sequence Parameter Set)
one or more PPS (Picture Parameter Set)
one or more APS (Adaptation Parameter Set), ordered by APS type.

Optionally one or more syntax elements are present before each of the list, indicating, which of the parameter set types are lists (including the option to disable sending).
The syntax structure holding the information is include into the Access Unit Delimiter (AUD).

An example syntax is shown in FIG. 8, i.e., in a predetermined unit, i.e., AUD, a plurality of identifiers 200 is included. For example, an identifier of VPS "aud_vps_id", an identifier of DPS "aud_dps_id", an identifier of SPS "aud_sps_id", an identifier of PPS "aud_pps_id", etc.

Signallinq of APS IDs Only in AUD

APSs are referred to by each slice of a picture. When combining bitstreams, different APSs may need to be rewritten and/or combined.

To avoid rewriting of slice headers, the APS IDs are signalled in the Access Unit delimiter instead of the slice header. So, in case of changes, the slice header does not have to be rewritten. Rewriting the Access Unit delimiter is a much easier operation.

An example syntax is shown in FIG. 9.

In another embodiment, the APS IDs are only sent in the AUD conditioned on another syntax element. If the syntax elements indicate, that the APS IDs are not present in the AUD, the APS IDs are present in the slice header. An example syntax is shown in FIG. 10. That is, as depicted in FIG. 10, the AUD includes a flag 204, e.g., a syntax "aps_ids_in_aud_enabled_flag".

Figure 11A:
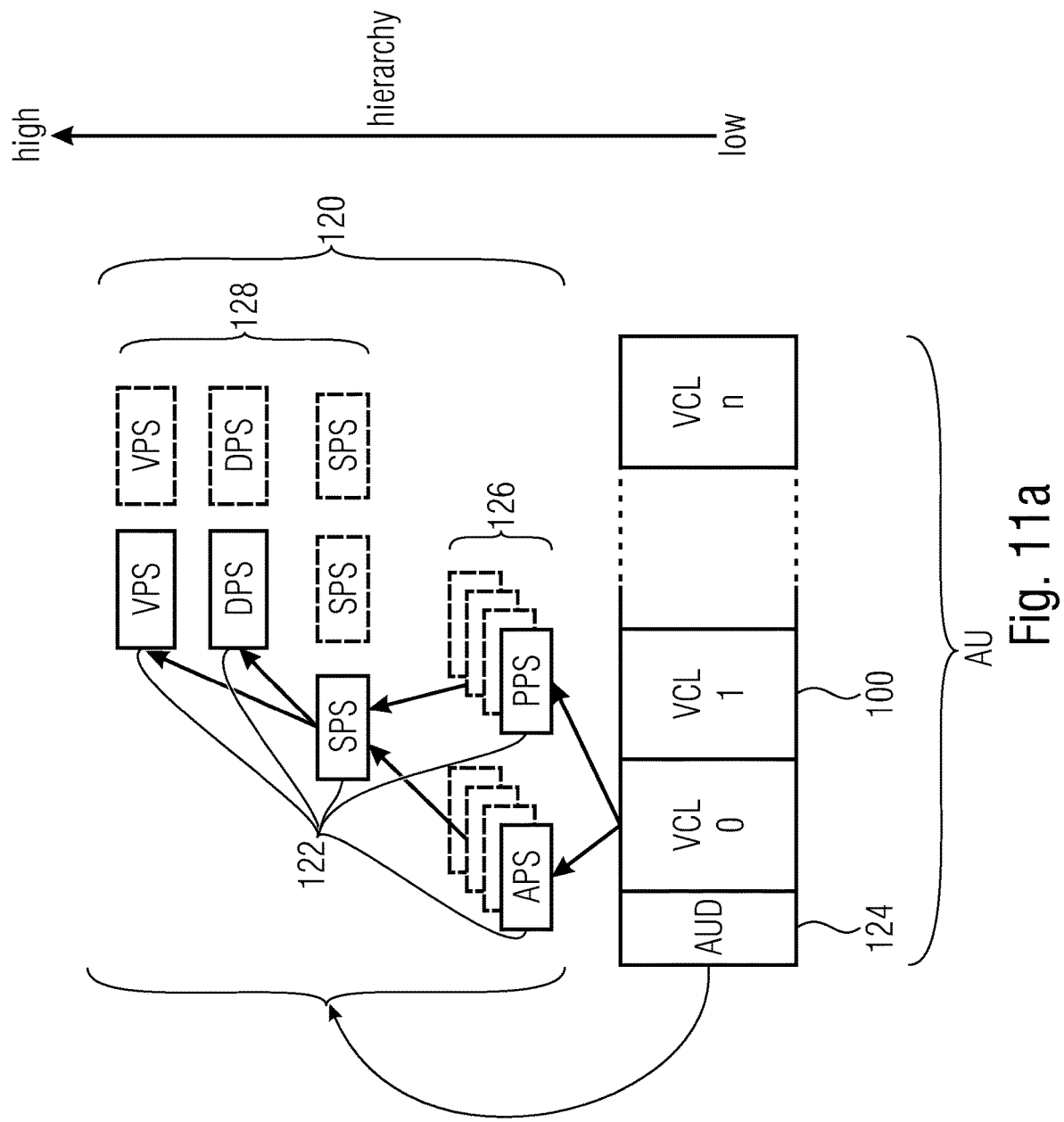
FIG. 11a shows a schematic illustration of an example indicating a relationship between predetermined coding parameter sets according to embodiments of the present application.

FIGS. 11a to 11c show a schematic illustration of examples indicating the relationship between the predetermined coding parameters and the AU according to the above mentioned embodiments shown in FIGS. 8 to 10.

As depicted in FIG. 11a, the plurality of parameter sets 120 comprises one or more first predetermined parameter sets 126, e.g. including APA and PPS, and one or more of second predetermined parameter sets 128, e.g., including SPS, DPS and VPS. The second predetermined parameter sets 128 belongs to a higher hierarchy level than the first predetermined parameter sets 126. As shown in FIG. 11a, the AU comprises a plurality of slice data, e.g., VCL 0 to VCL n, and the first and second predetermined parameter sets are contained by the predetermined parameter sets 122, e.g., the parameter set for VCL 0.

The plurality of parameter sets 120 is stored in the AUD of the AU and signalled to the decoder.

In case a flag 204 is included in the AUD as indicated in FIG. 11b, the flag 204 indicative 205 of whether either predetermined identifiers of the identifiers 200 which refer to specific predetermined parameter sets 126b are present in the predetermined unit 124, or the predetermined identifiers which refer to the specific predetermined parameter sets 126b are present in the one or more video coding units 100. That is, the flag 204 is indicative (depicted as arrow in FIG. 11b) whether the APS 126b is in the AUD or VLC.

As depicted in FIG. 11c, the first predetermined parameter sets 126 comprises a third predetermined parameter sets 126a, e.g., PPS, which are referred to by identifiers in the one or more video coding units 100, e.g., AU, and fourth predetermined parameter sets 126b, e.g., APS, which are referred to by identifiers 200 (as shown in FIGS. 8 and 9) present in the predetermined unit 124, e.g., AUD, but are neither referred to by any of the identifiers in the one or more video coding units 100 (AU), nor by any of the predetermined parameter sets.

Signalling of Access Unit Properties into the AUD

Currently the AUD indicates whether the following slices are of type I, B, or P. In most systems this feature is not very useful as I pictures do not necessarily mean there is a Random Access Point. Prioritization of AUs if some need to be dropped can be typically done by other means, e.g. parsing the temporal ID, parsing whether they are discardable pictures (not referenced by any other) and so on.

Instead of indicating the picture type, the NAL unit type could be indicated as well as the fact whether they are discardable pictures, etc. In addition, in the multi-layer case, the properties might be more difficult to be described:

A random access property of the picture, specified by an overall NAL unit type (e.g. IDR, CRA, etc.) to be used for all VCL NAL units in the access unit, instead of the one specifies in the NAL unit header.

A picture in a layer might be discardable in one layer but not a collocated picture in another layer.

A picture in a layer might be marked for no output (pic_output_flag) in one layer but not a collocated picture in another layer.

Therefore, in an embodiment depicted in FIG. 12a, the AUD indicates whether the information applies to a single layer or to all layers. That is, in the AUD flags refer to information regarding the AU properties as indicated below, for instance:

"layer_specific_aud_flag" 300: controlling whether separate access units are defined in the video data stream for pictures relating to one time instant but different layers of the video data stream, or whether the pictures relating to one time instant but different layers of the video data stream are coded into one of the access units, and/or "nal_unit_type_present_flag" 302: indicating a video coding type of video coding units comprised in the access units which is to be assigned to video coding units within one access units in case of a video coding type indication contained the video coding units within the one access unit differing from each other, i.e., by indicating the presence of a syntax element of the nal unit type, the nal unit type is indicated, and/or "discardable_flag" 304: indicating pictures of which access units are not referenced by any other picture, and/or "pic_outputflag" 306: indicating pictures not to be output. In another embodiment the AUD could indicate that it is a dependent AUD, meaning:

that inherits parameters from a previous AUD of a dependent layer but adds some layer specific information and/or no new AU started FIG. 12b depicts an indication in the AUD, i.e., the video coding type of the video coding units is indicated by describing a random access property of a multiple pictures. That is, a syntax "random_access_info_present_flag" indicates a random access property of the picture, e.g., as indicated in FIG. 12b "all_pics_in_au_random_access_flag", specified by an overall NAL unit type (e.g. IDR, CRA, etc.) to be used for all VCL NAL units in the access unit, instead of the one specifies in the NAL unit header.

An example syntax is shown in FIG. 13 according to an embodiment of the present invention. In this example, the parameter set 308, i.e., implementation "layer_specific_aud_flag" indicated whether the information in the AUD applies to all layers, "dependent_aud_fiag" indicated whether the AUD starts a new global access unit, or only a "layer-access unit". In a dependent AUD, inheritance from the base layer AUD is indicated by "aud_inheritance_flag".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the application can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present application can be implemented as a computer program product with a program code, the program code being operative for performing one of the methods when the computer program product runs on a computer. The program code may, for example, be stored on a machine readable carrier.

Other embodiments comprise a computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non— transitionary.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The invention claimed is:

1. A video decoding apparatus comprising a processor and a memory, the processor, working together with the memory, configured to:
   read one or more video coding layer (VCL) network abstraction layer (NAL) units representing one or more slices in a video data stream, wherein a VCL NAL unit of the one or more VCL NAL units includes an alf_ctb_flag that specifies whether an adaptive loop filter (ALF) is applied to a coding tree block (CTB) of the VCL NAL unit;
   generate a reconstructed version of a decoded picture from the one or more VCL NAL units; and
   perform adaptive loop filtering on the reconstructed version of the decoded picture in a manner depending on one or more ALF coefficients of a non-VCL NAL unit corresponding to a previous picture, wherein the non-VCL NAL unit has a suffix adaptive parameter set (APS) NAL unit type indicating that the non-VCL NAL unit follows after all VCL NAL units of an AU.

2. The video decoding apparatus of claim 1, wherein the video decoding apparatus is one of a computer or a mobile device.

3. A method for decoding a video data stream comprising:
   reading one or more video coding layer (VCL) network abstraction layer (NAL) units representing one or more slices in the video data stream, wherein a VCL NAL unit of the one or more VCL NAL units includes an alf_ctb_flag that specifies whether an adaptive loop filter (ALF) is applied to a coding tree block (CTB) of the VCL NAL unit;
   generating a reconstructed version of a decoded picture from the one or more VCL NAL units; and
   performing adaptive loop filtering on the reconstructed version of the decoded picture in a manner depending on one or more ALF coefficients of a non-VCL NAL unit corresponding to a previous picture, wherein the non-VCL NAL unit has a suffix adaptive parameter set (APS) NAL unit type indicating that the non-VCL NAL unit follows after all VCL NAL units of an AU.

4. A video encoding apparatus comprising a processor and a memory, the processor, working together with the memory, configured to:
   encode, in a video data stream, one or more adaptive loop filter (ALF) coefficients of a non-video coding layer (VCL) network abstraction layer (NAL) unit corresponding to a first picture, wherein the non-VCL NAL unit has a suffix adaptive parameter set (APS) NAL unit type indicating that the non-VCL NAL unit follows after all VCL NAL units of an AU; and
   encode one or more VCL NAL units representing one or more slices of a second picture that follows after the first picture in the video data stream, wherein a VCL NAL unit of the one or more VCL NAL units includes an alf_ctb_flag that specifies whether the one or more ALF coefficients is applied to a coding tree block (CTB) of the VCL NAL unit.

5. The video encoding apparatus of claim 4, wherein the video encoding apparatus comprises one of a computer or a mobile device.

6. A method for video encoding a video data stream comprising:
   encoding, in the video data stream, one or more adaptive loop filter (ALF) coefficients of a non-video coding layer (VCL) network abstraction layer (NAL) unit corresponding to a first picture, wherein the non-VCL NAL unit has a suffix adaptive parameter set (APS) NAL unit type indicating that the non-VCL NAL unit follows after all VCL NAL units of an AU; and
   encoding one or more VCL NAL units representing one or more slices of a second picture that follows after the first picture in the video data stream, wherein a VCL NAL unit of the one or more VCL NAL units includes an alf_ctb_flag that specifies whether the one or more ALF coefficients is applied to a coding tree block (CTB) of the VCL NAL unit.

7. A non-transitory computer readable medium storing instructions which, when executed, cause a computer to perform a method, the method comprising:
   reading one or more video coding layer (VCL) network abstraction layer (NAL) units representing one or more slices in the in a video data stream;
   generating a reconstructed version of a decoded picture from the one or more VCL NAL units; and
   performing adaptive loop filtering on the reconstructed version of the decoded picture in a manner depending on one or more ALF coefficients of a non-VCL NAL unit corresponding to a previous picture, wherein the non-VCL NAL unit has a suffix adaptive parameter set (APS) NAL unit type indicating that the non-VCL NAL unit follows after all VCL NAL units of an AU.

8. A non-transitory computer readable medium storing instructions which, when executed, cause a computer to perform a method, the method comprising:
   encode, in a video data stream, one or more adaptive loop filter (ALF) coefficients of a non-video coding layer (VCL) network abstraction layer (NAL) unit corresponding to a first picture, wherein the non-VCL NAL unit has a suffix adaptive parameter set (APS) NAL unit type indicating that the non-VCL NAL unit follows after all VCL NAL units of an AU; and
   encoding one or more VCL NAL units representing one or more slices of a second picture that follows after the first picture in the video data stream, wherein a VCL NAL unit of the one or more VCL NAL units includes an alf_ctb_flag that specifies whether the one or more ALF coefficients is applied to a coding tree block (CTB) of the VCL NAL unit.

* * * * *